(12) United States Patent
Sarlis

(10) Patent No.: US 7,776,296 B2
(45) Date of Patent: Aug. 17, 2010

(54) REGENERATION OF ION EXCHANGERS THAT ARE USED FOR SALT REMOVAL FROM ACID GAS CAPTURE PLANTS

(75) Inventor: John Nicolas Sarlis, Laval (CA)

(73) Assignee: Cansolv Technologies Inc., Montreal, Quebec (CA)

( * ) Notice: Subject to any disclaimer, the term of this patent is extended or adjusted under 35 U.S.C. 154(b) by 1195 days.

(21) Appl. No.: 11/371,924

(22) Filed: Mar. 10, 2006

(65) Prior Publication Data

US 2007/0213415 A1    Sep. 13, 2007

(51) Int. Cl.
*C01B 17/15* (2006.01)
(52) U.S. Cl. .................... 423/229; 55/73; 210/669; 423/226; 423/228; 423/230; 423/242.7
(58) Field of Classification Search ......... 423/229, 423/226, 228, 230, 242.7; 210/669; 55/73
See application file for complete search history.

(56) References Cited

U.S. PATENT DOCUMENTS

| | | | |
|---|---|---|---|
| 4,113,849 A | 9/1978 | Atwood | |
| 4,122,149 A | 10/1978 | Dunnery et al. | |
| 4,970,344 A | 11/1990 | Keller | |
| 5,019,361 A | 5/1991 | Hakka | |
| 5,045,291 A | 9/1991 | Keller | |
| 5,292,407 A | 3/1994 | Roy et al. | |
| 5,368,818 A | 11/1994 | Cummings et al. | |
| 5,788,864 A | 8/1998 | Coberly et al. | |
| 6,071,484 A * | 6/2000 | Dingman et al. | 423/229 |
| 6,245,128 B1 | 6/2001 | George, Jr. | |
| 6,334,886 B1 | 1/2002 | Barnes, Jr. et al. | |
| 6,517,700 B2 * | 2/2003 | Byszewski | 205/431 |
| 7,056,482 B2 * | 6/2006 | Hakka et al. | 423/230 |

FOREIGN PATENT DOCUMENTS

| | | |
|---|---|---|
| EP | 0429183 A1 | 5/1991 |
| EP | 429183 A1 * | 5/1991 |
| EP | 0430432 A2 | 6/1991 |
| EP | 430432 A2 * | 6/1991 |
| EP | 0471592 A2 | 2/1992 |

* cited by examiner

*Primary Examiner*—Peter D. Mulcahy
*Assistant Examiner*—Henry Hu
(74) *Attorney, Agent, or Firm*—Philip C. Mendes da Costa; Bereskin & Parr LLP/S.E.N.C.R.L., s.r.l.

(57) ABSTRACT

A process for the removal of an amine capturable gas from a feed gas stream using an amine solvent, the process comprises (a) contacting the feed gas stream with a lean amine solvent to form a rich amine solvent, wherein heat stable salts are present in the rich amine solvent; (b) stripping amine capturable gas from the rich amine solvent to form the lean amine solvent and an overhead reflux stream; (c) periodically contacting at least a portion of one or both of the lean amine solvent and the rich amine solvent with an anion exchange resin to form a first heat stable salt lean amine solvent; (d) periodically regenerating the anion exchange resin, wherein during the regeneration of the anion exchange resin, at least a portion of the reflux stream is used to wash the amine solvent from the anion exchange resin to produce a second heat stable salt lean amine solvent; and, (e) recycling at least a portion of the first and the second heat stable salt lean amine solvent for use in capturing the amine capturable gas from the feed gas.

16 Claims, 3 Drawing Sheets

REGENERATION OF ION EXCHANGERS THAT ARE USED FOR SALT REMOVAL FROM ACID GAS CAPTURE PLANTS

FIELD OF THE INVENTION

In one aspect, this invention relates to a process to regenerate an ion exchanger used to capture salts from a solution. In accordance with another aspect, this invention relates to the integration of an ion exchange process with an acid gas capture process. In a particularly preferred embodiment, the acid gas that is captured comprises one or more of sulfur dioxide, hydrogen sulfide and carbon dioxide.

BACKGROUND OF THE INVENTION

The separation of acid gases such as sulfur dioxide, hydrogen sulfide or carbon dioxide from gas streams such as flue gas or hydrocarbon containing streams by means of absorption into aqueous amine solvents is well known. Many of these process, which are referred to as amine treater processes, are described in "Gas Purification", 5$^{th}$ Edition, Ed. Arthur L. Kohl and Richard B. Nielsen, Gulf Publishing Company, Houston, Tex.

Amine treater processes use a regenerable amine solvent whereby the acid gas is captured into the solvent at one temperature and the acid gas is desorbed or stripped from the solvent, generally at a higher temperature.

The amine solvent for removing a given acid gas component from a feed stream may be chosen so that the acid gas can be removed from the solvent by steam stripping. If steam stripping is utilized, then in order to separate the acid gas from the solvent, the acid gas must be volatile while in solution. Preferably, the acid ionization constant of the conjugate acid of the amine (the $pK_a$) has a value no more than about 3 or 4 units higher than the $pK_a$ of the acid gas. If this difference in $pK_a$ is larger than about 3 or 4 units, then the salt formed between the amine and the acid is too stable to be practically dissociated by steam stripping.

In commercial operation, acid gas capture processes experience ingress and/or in process generation of acids that are stronger than the acids for which the removal process is designed. These stronger acids form salts with the amine solvent which are not regenerable with steam and are thus termed heat stable amine salts, or just heat stable salts.

If the heat stable salts are allowed to accumulate, they will eventually neutralize all the amine of the solvent, rendering it unable to react with and remove the acid gas component as intended. Accordingly, provision for heat stable salt removal is necessary for systems where strong acids accumulate in the amine solvent.

Various means for removal of heat stable salts from amine gas treating solutions are known. These include distillation of the free amine away from the salt at either atmospheric or subatmospheric pressure (see for example "Gas Purification", p. 255ff), electrodialysis (see for example U.S. Pat. No. 5,292,407) and ion exchange (see for example U.S. Pat. Nos. 4,122,149; 4,113,849; 4,970,344; 5,045,291; 5,292,407; 5,368,818; 5,788,864 and 6,245,128).

One problem with ion exchange processes is that the ion exchange medium or resin must be regenerated from time to time. During the loading stage of the ion exchange process, the anion removal capacity is used up as heat stable salts are removed from the amine solvent. Upon exhaustion or reduction of the anion removal capacity of the ion exchange resin by a particular amount, feed of the heat stable salt rich amine solvent to the ion exchange resin is terminated so that the ion exchange resin may be regenerated. Since the ion exchange resin regeneration agent will typically be sent to waste water treatment or otherwise be disposed of, the amine solvent in the amine resin bed may be displaced and washed by large volumes of water prior to commencing the flow of resin regeneration agent to the column, in order to recover a dilute amine solvent solution prior to the ion exchange resin being regenerated. If the dilute amine solvent solution is returned to the acid gas capture process, thereby avoiding loss of amine solvent, this introduces water to the amine solvent in the acid gas capture process thereby diluting the concentration of the amine solvent in the solvent solution in the amine treater process.

Amine treater processes are designed to work at a fixed, optimum amine solvent concentration. Therefore, dilution of the amine solvent is undesirable. Accordingly, water should be removed from the amine solvent if the diluted amine solution is returned to the acid gas treatment process or the dilute amine solvent stream may be discarded to waste, resulting in a loss of amine solvent.

SUMMARY OF THE INVENTION

In accordance with one embodiment of the instant invention, an improved process for regenerating an ion exchange resin is provided. In particular, it has been determined that the deficiencies of amine dilution and the large volume of water wash required to efficiently recover the amine after the loading step can be minimized by integrating the operation of the amine treater with the ion exchange process.

In operation, the ion exchange medium (generically referred to herein as a resin) may be contained in a packed bed, which is provided, e.g., in a column. A heat stable salt rich amine solvent is passed through the column. The heat stable salts are captured by the ion exchange resin during the passage of the amine solvent though the column. When it is determined that the ion exchange resin should be regenerated, the flow of the amine absorbent through the column is terminated and a regenerating agent is fed through the column. It is preferred that all, or substantially all, of the amine solvent is removed from the column prior to regeneration the ion exchange medium.

The amount of amine dilution occurring by the return of the dilute amine solution formed by the washing of the amine from the column prior to the regeneration process of the ion exchange resin can be reduced by using reflux from the amine treater regeneration column to displace and wash the amine from the ion exchange column at the end of the exhaustion step. The used reflux containing amine solvent may then be recycled to the amine treater process. Large volumes of reflux can be used to ensure a high degree of amine recovery from the column and returned to the amine treater process, since this wash water is sourced from the treating solvent itself and therefore does not result in dilution of the amine in process. Preferably the ion exchange bed wash water, which is obtained from the steam stripper reflux stream and is used to wash amine absorbent from the ion exchange bed, is recycled to the acid gas capture process without the addition of any make up water.

Accordingly, the source of the wash water for removing amine absorbent from the ion exchange bed may be predominantly or essentially water which is obtained from the acid gas capture process. This provides two advantages. First, the dilution of the amine solvent is reduced or essentially eliminated. In particular, if no additional process water is added from sources external to the treater process to the wash water feed stream, then the only water used to flush amine from the ion exchange bed is obtained from the acid gas capture process (i.e. the reflux stream). Accordingly, no net dilution of the amine absorbent occurs. If some additional make up water is required due to limited availability of reflux, then the amount of dilution is substantially reduced as compared to the use of only external wash water. A further advantage is that by recycling the wash water containing amine absorbent to the amine treater process, the creation of a wash water effluent stream, which must be either disposed of or treated, is avoided or at least reduced.

In accordance with another aspect of the invention, an acidic solution, which is preferably obtained from a reflux stream, is utilized to provide wash water to remove an acid gas absorbent from an ion exchanger prior to the regeneration of the ion exchange resin. The wash water that is utilized may comprise all or a portion of a reflux stream which is obtained from a steam-stripping column utilized in an amine treater process. For example, if the amine treater process is used to treat a sulfur dioxide containing feed gas stream, then the reflux will contain sulfurous acid, i.e. the hydrate of sulfur dioxide, in solution. Alternately, if the amine treater process is used to treat a feed gas stream containing hydrogen sulfide and/or carbon dioxide, then the reflux stream will contain carbonic acid and/or hydrogen sulfide. Such reflux streams are acidic but do not interfere with the regeneration process, provided that the concentration of the acid gas dissolved in the reflux is less than 5 wt. %, more preferably less than 3 wt. % and most preferably less than 2% by weight.

In accordance with another embodiment of the instant invention, it will be appreciated that the wash water utilized to remove the amine solvent from an ion exchange bed may be obtained form an alternate source, provided that the water concentration in the treater amine solvent can be controlled by other means, such as blowing down reflux to the prescrubber.

In an amine treater process, hot feed gas is typically quenched prior to contacting the feed gas with the aqueous amine solvent, to prevent degradation and dehydration of the amine solvent. The quenching process uses the evaporation of water to cool and water saturate the gas. This quenching is often performed e.g. in a spray prescrubber. The water in the prescrubber is recirculated by a pump to the spray nozzles, with some blowdown of water to control the pH, the concentration of dissolved solids and the level of suspended solids. Makeup water, usually deionized water or steam condensate, is added to the prescrubber to maintain the water inventory constant. In accordance with another aspect of this invention, effluent streams from the ion exchange process are used as makeup water in the prescrubber, eliminating or greatly reducing the volume of effluents resulting from the regeneration of the ion exchange resin that have to be otherwise treated for disposal.

Accordingly, in accordance with one embodiment of the invention there is provided a process for the removal of an amine captureable gas from a feed gas stream using an amine solvent, the process comprising:
(a) contacting the feed gas stream with a lean amine solvent to form a rich amine solvent, wherein heat stable salts are present in the rich amine solvent;
(b) stripping amine captureable gas from the rich amine solvent to form the lean amine solvent and an overhead reflux stream;
(c) periodically contacting at least a portion of one or both of the lean amine solvent and the rich amine solvent with an anion exchange resin to form a first heat stable salt lean amine solvent;
(d) periodically regenerating the anion exchange resin, wherein during the regeneration of the anion exchange resin, at least a portion of the reflux stream is used to wash the amine solvent from the anion exchange resin to produce a second heat stable salt lean amine solvent; and,
(e) recycling the at least a portion of the first and second heat stable salt lean amine solvent for use in capturing the amine captureable gas from the feed gas.

In one embodiment, the method further comprises selecting the amine captureable gas from one or more of $SO_2$, $H_2S$ and $CO_2$.

In another embodiment, the method further comprises selecting the lean amine solvent as the amine solvent that is contacted with the anion exchange resin.

In another embodiment, during step (d), the anion exchange resin is treated to remove the amine solvent therefrom prior to regenerating the anion exchange resin.

In another embodiment, step (d) comprises:
(a) the anion exchange resin is contacted with water to wash amine solvent from the anion exchange resin;
(b) the anion exchange resin is subsequently contacted with a regeneration agent to obtain regenerated anion exchange resin and spent regeneration agent solution; and,
(c) washing the anion exchange resin with water to remove the regeneration agent therefrom and to obtain a regeneration agent wash effluent.

In another embodiment, the method further comprises washing the regenerated anion exchange resin with water to remove the regeneration agent therefrom prior to using the regenerated anion exchange resin in step (c).

In another embodiment, the method further comprises:
(a) subjecting the feed gas stream to a pre-scrubbing operation;
(b) using all or a portion of one or both of the spent regeneration agent solution and the regeneration agent wash effluent in the pre-scrubbing operation.

In another embodiment, the method further comprises draining amine solvent from the anion exchange resin prior to contacting the anion exchange resin with water to wash amine solvent from the anion exchange resin.

In another embodiment, the method further comprises providing an amine solvent which has an amine with a pKa in the range 2.5-6. Preferably, the method further comprises selecting $SO_2$ as the amine captureable gas.

In another embodiment, the method further comprises providing an amine solvent which has an amine with a pKa in the range 7.5-10. Preferably, the method further comprises selecting the amine captureable gas from one or more of $H_2S$ and $CO_2$.

In another embodiment, the heat stable salt lean amine is recycled to step (a).

In another embodiment, the heat stable salt lean amine is recycled to step (b).

In another embodiment, the method further comprises selecting $SO_2$ as the amine captureable gas.

In another embodiment, the reflux is utilized without dilution to wash the amine solvent from the anion exchange resin.

In accordance with another embodiment of the invention there is provided a process for regenerating an ion exchange resin comprising:
(a) obtaining a solvent solution containing heat stable salts from an amine treater process;
(b) contacting the solvent solution with an anion exchange resin to obtain a heat stable salt lean solvent solution;

(c) periodically regenerating the anion exchange resin, wherein prior to the regeneration of the anion exchange resin, the anion exchange resin is washed with at least a portion of a reflux stream from the amine treater process to produce a heat stable salt lean amine stream; and, (d) recycling the heat stable salt lean amine to the amine treater process.

In one embodiment, the amine treater process treats a feed gas to remove one or more of $SO_2$, $H_2S$ and $CO_2$.

In another embodiment, during step (c), the anion exchange resin is treated to remove the amine solvent therefrom prior to regenerating the anion exchange resin.

In another embodiment, step (c) comprises:
(a) the anion exchange resin is contacted with water to wash amine solvent from the anion exchange resin;
(b) the anion exchange resin is subsequently contacted with a regeneration agent to obtain regenerated anion exchange resin and spent regeneration agent solution; and,
(c) washing the anion exchange resin with water to remove the regeneration agent therefrom and to obtain a regeneration agent wash effluent.

In another embodiment, the method further comprises washing the regenerated anion exchange resin with water to remove the regeneration agent therefrom prior to using the regenerated anion exchange resin in step (b).

In another embodiment, the method further comprises:
(a) subjecting a feed gas stream provided to the amine treater process to a pre-scrubbing operation;
(b) using all or a portion of one or both of the spent regeneration agent solution and the regeneration agent wash effluent in the pre-scrubbing operation.

In another embodiment, the method further comprises draining amine solvent from the anion exchange resin prior to contacting the anion exchange resin with water to wash amine solvent from the anion exchange resin.

In another embodiment, the heat stable salt lean amine is recycled to the amine treater process.

In another embodiment, the reflux is utilized without dilution to wash the amine solvent from the anion exchange resin.

BRIEF DESCRIPTION OF THE DRAWINGS

These and other advantages of the instant invention will be more fully and completely understood in accordance with the following description of the preferred embodiments of the invention in which.

DETAILED DESCRIPTION OF THE INVENTION

While in one aspect the invention is directed to a regeneration process for an ion exchange unit that treats an amine solution, the invention will be exemplified in combination with an amine treater process.

Figure 1:
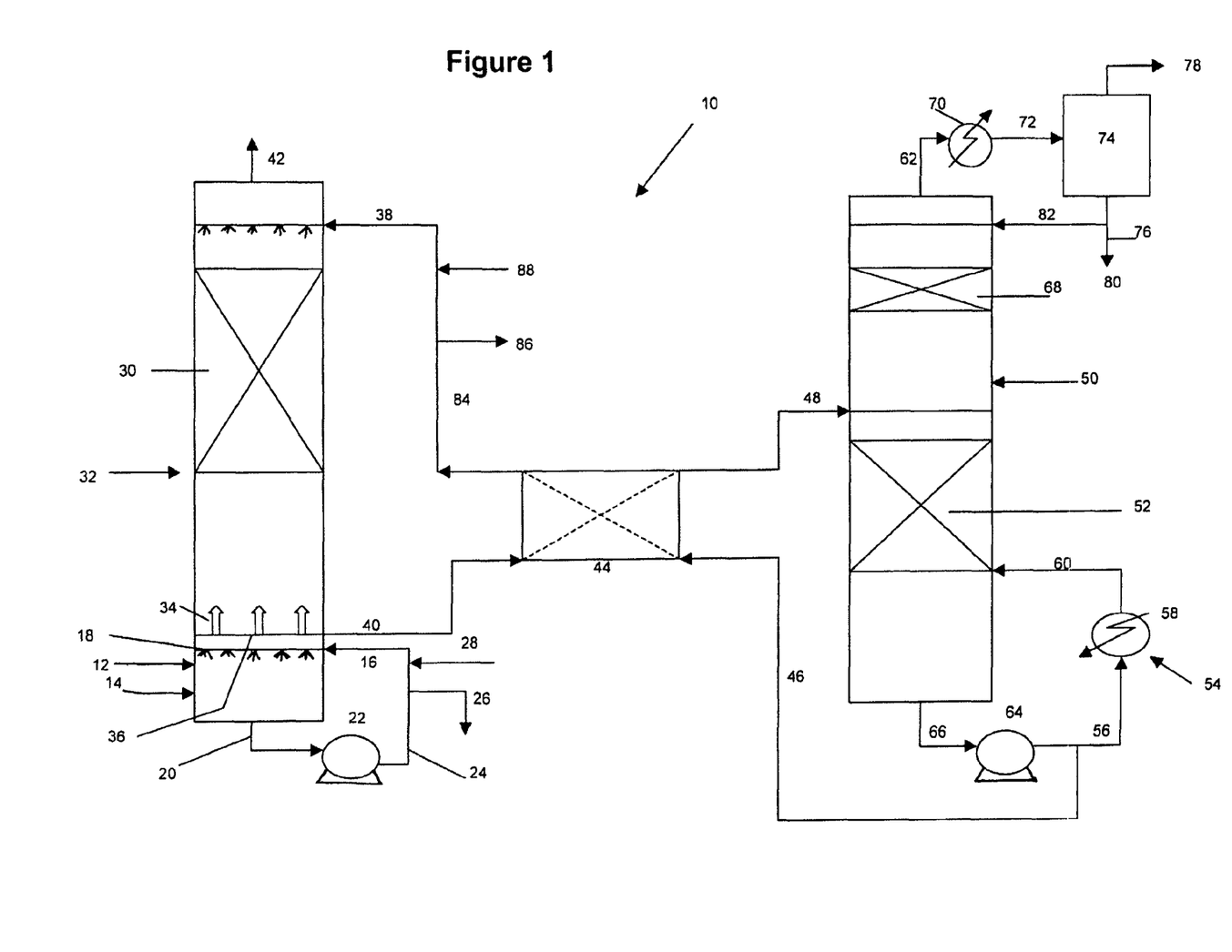
FIG. 1 is an exemplary process flow diagram of an amine treater process, showing streams connecting it to the ion exchange process according to an embodiment of this invention.
Figure 2:
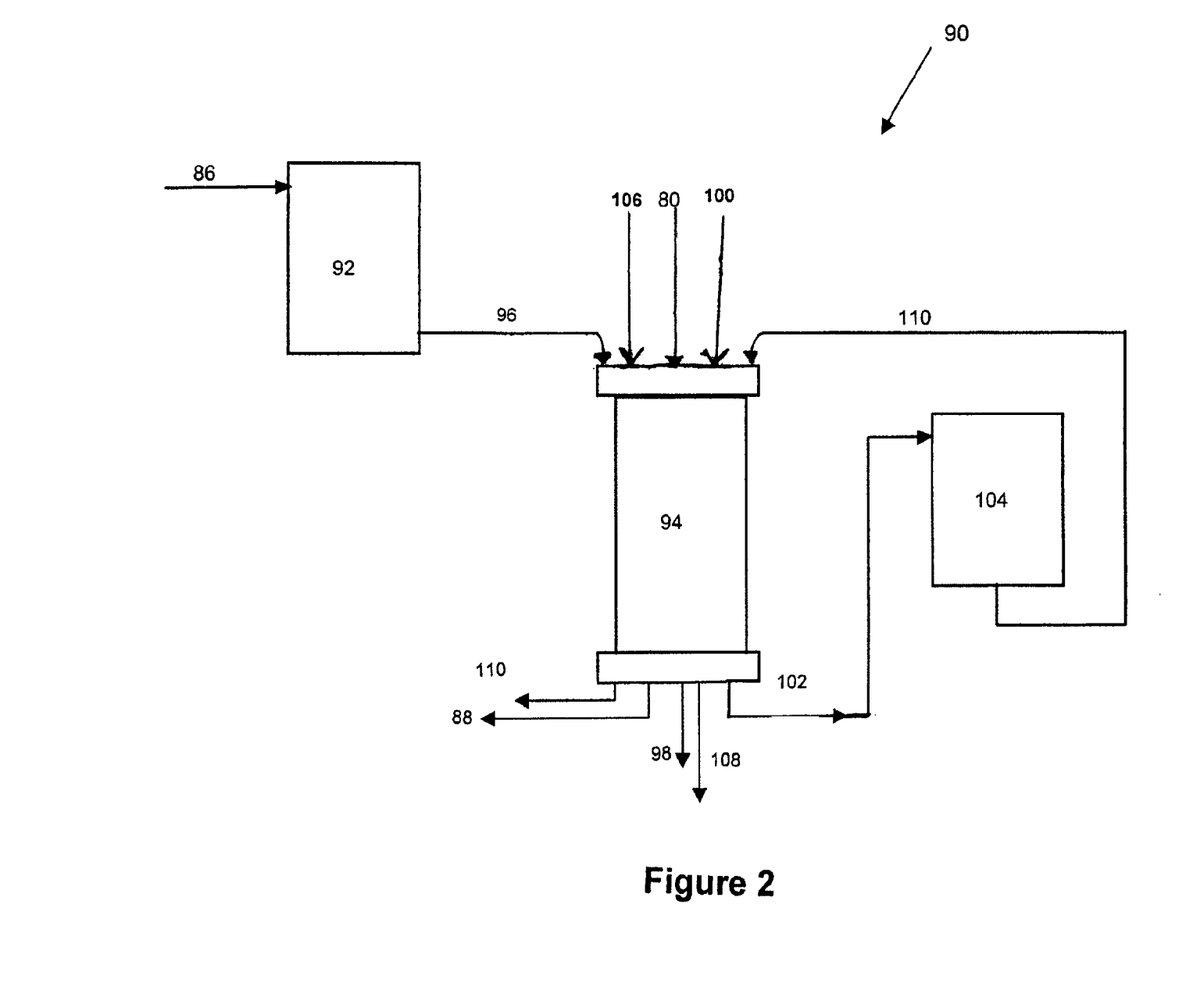
FIG. 2 is an exemplary embodiment of a process flow diagram of the ion exchange process that may be used with the amine treater process of FIG. 1 showing streams connecting it to the amine treater process according to an embodiment of this invention; and, FIG. 3 is a preferred sequence of operations in one cycle of an ion exchange column operation, starting from exhaustion of the resin to a final water wash after regeneration.
Figure 3:
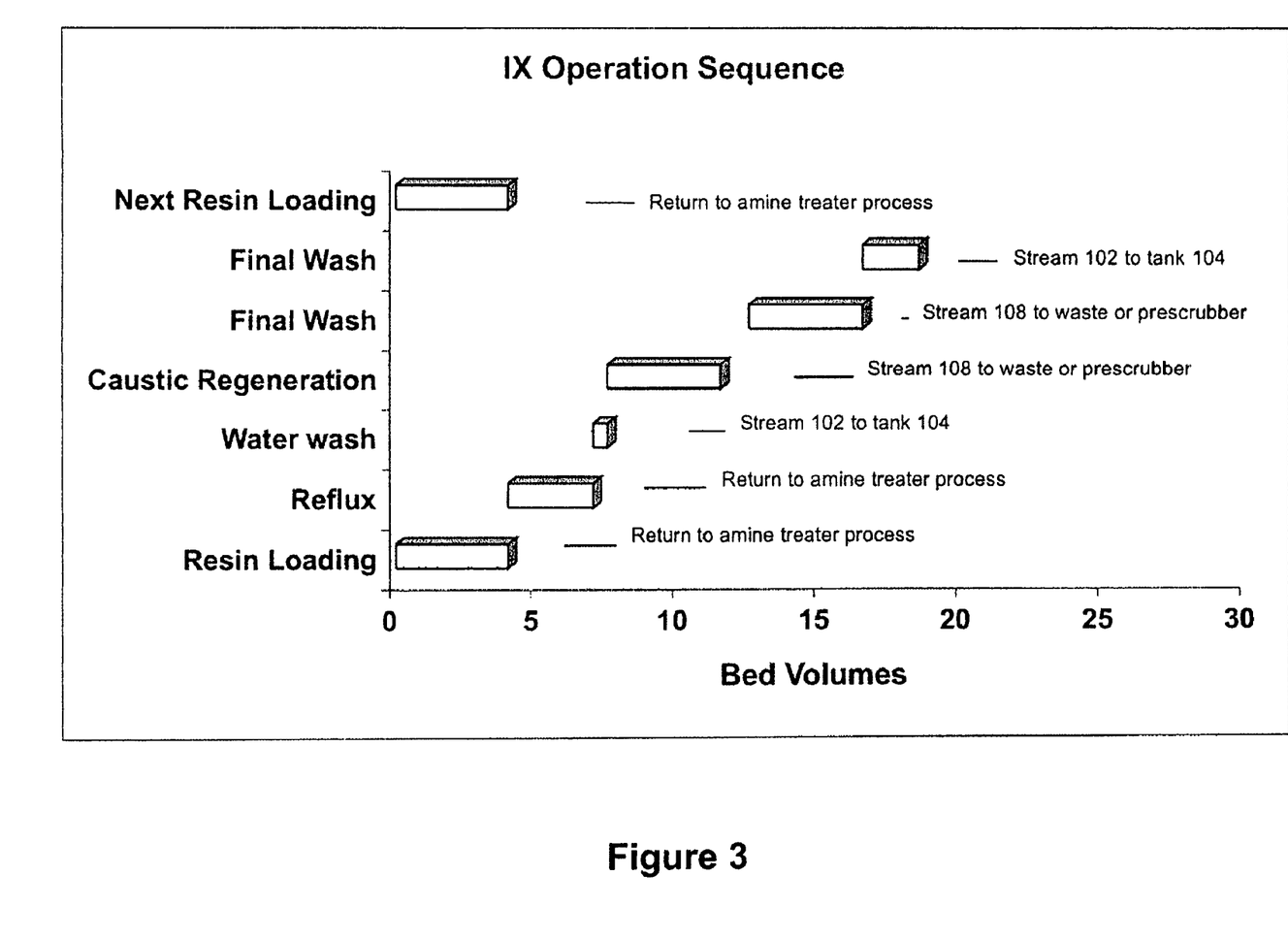

As shown in FIGS. 1 and 2, an ion exchange unit (FIG. 2) may be integrated with an amine treater process (FIG. 1) so as to remove heat stable salts from an amine solvent. It will be appreciated that any particular design known in the art may be used for the amine treater unit and the ion exchange unit and that the embodiments shown in FIGS. 1 and 2 are exemplary. For example a feed gas may contain only one target gas (e.g. sulphur dioxide) or a plurality of target gases (e.g. sulphur dioxide and carbon dioxide). If a plurality of gases are targeted for removal from the feed gas, then the amine treater unit may have a plurality of absorption zones, each of which utilizes a different solvent stream thereby producing a plurality of solvent streams which may be individually regenerated. For example, a first solvent loop may be provided for removing sulphur dioxide from an acid gas using a first solvent and regenerating the first solvent. A second solvent loop may be provided for removing carbon dioxide from the acid gas using a second solvent, subsequent to the removal of the sulphur dioxide, and regenerating the second solvent. A first ion exchange unit may be utilized to remove heat stable salts from the first amine absorbent and a second ion exchange unit may be utilized to remove heat stable salts from the second amine absorbent. It will also be appreciated that each ion exchange unit may comprise one or a plurality of ion exchange reactors or columns and may utilize feed tanks and reservoir tanks as is known in the art, such as for use in ensuring a continuous feed to an ion exchange column and reducing surges through the process.

It will be appreciated that the feed gas stream may contain only one or a plurality of acid gasses, e.g., $SO_2$ and/or $H_2S$, and/or $CO_2$, and that feed gas stream may be sequentially treated in different stages to reduce the concentration of each acid gas to below a predetermined level. Accordingly, a feed gas stream may be contacted with a first amine solvent to reduce the concentration of a first acid gas, e.g., $SO_2$, to below a predetermined level. The feed gas stream may then be contacted with second amine solvent to selectively capture a second acid gas, e.g. $CO_2$ and/or $H_2S$ from the feed gas stream. The feed gas stream may then be contacted with a third amine solvent to selectively capture a third gas, e.g. $NO_x$ from the feed gas stream. Alternately, two or more gasses may be removed in one treatment stage. Accordingly, one solvent may be used to capture two or more gasses from the feed gas stream. It will be appreciated that the feed gas stream may also contain $NO_x$, which may be captured by an iron (II) EDTA complex. As the resultant Fe EDTA (nitrosyl) salt formed by the absorption of $NO_x$ from the feed gas would be removed by the ion exchange resin, it is preferred that heat stable salts be removed from a regenerable $NO_x$ absorbent by other means known in the art. Accordingly, it is preferred that the ion exchange process set out herein be used in association with the regeneration of an absorbent used in an amine captureable gas capture process (i.e. capable of being stripped from a feed gas by an amine solvent, e.g., $SO_2$, $H_2S$, $CO_2$).

Heat stable salts may build up in each solvent. Therefore, at least a portion of each solvent may be separately fed to an ion exchange unit to remove heat stable salts from the solvent. Thus, the first solvent may be fed to a first ion exchange column and the second solvent may be fed to a second ion exchange column. In this way, each solvent may be circulated in a separate loop to prevent mixing of the different solvent streams. Alternately, each solvent may be separately treated in a single ion exchange unit.

The feed gas provided to the amine treater process may be any gas stream that contains at least one acid gas. Preferably the feed gas stream contains at least one of $SO_2$, $CO_2$ and $H_2S$, and more preferably contains at least $SO_2$ and $CO_2$. The feed gas may be a process gas stream or a waste gas stream obtained from various sources. For example, the feed gas stream may be:

(a) Sour natural gas, comprising methane, other hydrocarbons, hydrogen sulfide, carbon dioxide and water, usually at elevated pressure of up to 100 bar and moderate temperature near ambient.

(b) Flue gas from the combustion of sulfur-free fossil fuel comprising nitrogen, oxygen, carbon dioxide and water at close to atmospheric pressure and elevated temperature of up to 200° C. or even higher.

(c) Flue gas from the combustion of sulfur containing fossil fuel, comprising nitrogen, oxygen, carbon dioxide, sulfur dioxide, sulfur trioxide and water at substantially atmospheric pressure and elevated temperature of up to 200° C. or even higher.

(d) Sulfuric acid plant tail gas comprising nitrogen, oxygen, sulfur dioxide and sulfur trioxide at close to atmospheric pressure and moderately elevated temperature of less than 200° C.

When sulfur dioxide dissolves in and reacts with water, it produces sulfurous acid, $H_2SO_3$, which is a substantially stronger acid ($pK_{a1}=1.8$) than carbonic acid, $H_2CO_3$ ($pK_{a1}=6.4$), produced by the hydration of carbon dioxide or hydrogen sulfide ($pK_{a1}=7.0$). If it is desired to capture sulfur dioxide from a feed gas using a regenerable amine treater process, then an appropriately weak amine having a $pK_a$ preferably less than 6 is preferably used. The weak amine is not able to capture any significant quantity of $CO_2$, which stays in the treated gas. Accordingly, such a weak amine may be used to selectively capture $SO_2$ from a feed gas contain $SO_2$ and $CO_2$. Sulfuric acid mist ($pK_{a2}=-3$) is so strong that it forms heat stable salts with regenerable $SO_2$ solvents.

The alkanolamine solvent used to selectively capture $SO_2$ may be any of those disclosed in U.S. Pat. No. 5,019,361, the disclosure of which is incorporated herein by reference. In particular, the solvent may be represented by the structural formula:

wherein $R^1$ is alkylene of two or three carbon atoms, $R^2$, $R^3$, $R^4$, and $R^5$ may be the same or different and can be hydrogen, alkyl (e.g., lower alkyl of 1 to about 8 carbon atoms including cycloalkyls), hydroxyalkyl (e.g., lower hydroxy alkyl of 2 to about 8 carbon atoms), aralkyl (e.g., 7 to about 20 carbon atoms), aryl (preferably monocyclic or bicyclic), alkaryl (e.g., 7 to about 20 carbon atoms), and any of $R^2$, $R^3$, $R^4$, and $R^5$ may form cyclic structures. Diamines are organic compounds containing two nitrogen atoms, and are often preferred due to their commercial availability and generally lower viscosity. The amines, e.g., diamines preferably are tertiary diamines, in view of their stability. However, others may be employed, provided mild oxidative or thermal conditions exist to minimize chemical reaction of the solvent. Often, the preferred amine salt absorbents have a hydroxyalkyl group as a substituent on an amine group. In some instances, the hydroxy substituent is believed to retard the oxidation of sulphite or bisulphite to sulphate.

To enable a high loading of recoverable sulphur dioxide to be absorbed in the absorbing medium under atmospheric pressure conditions, it is preferable for the free amine form of the amine absorbent to have a molecular weight less than about 300, preferably less than about 250. Often the tertiary diamines are of the formula:

wherein $R^1$ is an alkylene group, preferably containing from 2 to 3 carbon atoms as a straight chain or as a branched chain, and each $R^2$ is the same or different and is an alkyl group, preferably methyl or ethyl, or a hydroxyalkyl group, preferably 2-hydroxyethyl. Specifically preferred compounds are N,N'N'-(trimethyl)-N-(2-hydroxyethyl)-ethylenediamine (pKa=5.7); N,N,N',N'-tetramethylethylenediamine (pKa=6. 1); N,N,N',N'-tetrakis (2-hydroxyethyl) ethylenediamine (pKa=4.9); N-(2-hydroxyethyl) ethylenediamine (pKa=6.8); N,N'-dimethylpiperazine (pKa=4.8); N,N,N',N'-tetrakis (2-hydroxyethyl)-1,3-diaminopropane; and N',N'-dimethyl-N,N-bis(2-hydroxyethyl) ethylenediamine. Also included among the useful diamines are heterocyclic compounds, such as piperazine (pKa=5.8). The pKa values are for the sorbing nitrogen.

If it is desired to capture weak acid gases such as $H_2S$ and/or $CO_2$, then a stronger amine of $pK_a>7.5$, such as monoethanolamine, diethanolamine or methyldiethanolamine are preferably used. Acids substantially stronger than $H_2S$ or carbonic acid will form heat stable salts. Examples are $SO_2$, formic acid, acetic acid, hydrochloric acid, sulfuric acid and thiocyanic acid.

The carbon dioxide solvent amines may be primary, secondary or tertiary with $pK_a$'s in the range 6.0-10, preferably 6.5-10 and, more preferably 6.5-9.5. To prevent loss of the amine with the treated gas, the preferred amines preferably have a vapor pressure less than 1 mm Hg at 50° C. over the solvent. Preferred amines include 4-(2-hydroxyethyl)-1-piperazineethanesulfonic acid ($pK_a=7.5$), morpholinoethanesulfonic acid ($pK_a=6.1$), N-(2-hydroxyethyl)ethylenediamine ($pK_a1=9.5$, $pK_a2=6.5$), piperazine ($pK_a1=9.8$, $pK_a2=5.6$), N-(2-hydroxyethyl)piperazine ($pK_a1=9.0$, $pK_a2=4.5$), benzimidazole ($pK_a$ 5.5), and N,N'-bis(2-hydroxyethyl)piperazine ($pK_a1=7.8$, $pK_a2=3.9$) and mixtures thereof.

If it is desired to capture both $SO_2$ and $CO_2$, then to avoid all of the $SO_2$ forming a heat stable salt in the $CO_2$ capture process, the $SO_2$ is preferably captured first with an appropriate solvent. The $CO_2$ is then removed in a second step. Since hydrogen sulfide is not thermodynamically stable in the presence of $SO_2$ or oxygen, so only minor concentrations are generally found in $SO_2$ or $O_2$ containing streams.

In the preferred embodiment of FIG. 1, feed gas stream 12 that is treated in amine treater unit 10 contains a single targeted amine captureable gas, e.g., $SO_2$. As shown in FIG. 1, preferably, feed gas stream 12 is first prescrubbed to remove particulate matter from feed gas stream 12 and to quench H, preferably, to at least about its adiabatic saturation temperature. In some cases, the feed gas temperature may be reduced even lower by providing a heat exchanger to cool the circulating water. This water pre-treatment may also remove other contaminants from the feed gas, e.g. hydrochloric acid and sulfuric acid. Any prescrubber system known in the art may be used. As shown in FIG. 1, feed gas stream 12 may be fed to prescrubber 14 where it is contacted counter-currently with a prescrubbing fluid stream 16, preferably water, which may be sprayed into prescrubber 14 through suitable nozzles 18. The prescrubbing fluid stream 16 is preferably recirculated. Accordingly, a recycle stream 20 may be fed to pump 22 from which return stream 24 is returned to prescrubber 14. A blowdown stream 26 going to waste may be used to control the level of dissolved and suspended solids in the recirculating water and a water makeup stream 28 may be used to replace water lost to evaporation into the feed gas and to blowdown.

After passing through the optional prescrubber 14, the pre-treated feed gas stream may then be passed through an absorption zone 30 in column 32, which may be a sulphur dioxide absorption zone. Prescrubbed gas 34 may flow from prescrubber 14 into the absorption column 32 through, e.g., a chimney tray 36, which allows the passage of gas up but prevents liquid from flowing down into prescrubber 14.

A lean amine solvent (i.e., lean in the acid gas impurity) is preferably a regenerated solvent and may be introduced via stream 38 into absorption column 32 where it preferably flows counter-current to the pre-treated feed gas 34 stream so as to produce rich amine solvent stream 40 and a treated feed gas stream 42. Preferably, the lean amine solvent stream 38 flows downward through, e.g., packing in absorption zone 32, which promotes good gas-liquid contact with the upwardly flowing gas. The lean solvent selectively captures the acid gas impurity, leaving the absorption column as rich solvent stream 40.

The treated feed gas stream 42 may then be introduced to a one or more additional absorption zones (not shown), released to the atmosphere, transported to additional equipment for further treating or recycled within a process. For example, a second absorption zone may be designed to remove carbon dioxide from the feed gas stream. A third absorption zone may be designed to remove $NO_x$ and optionally some mercury from the feed gas stream. It will be appreciated that the acid gasses may be selectively removed from the feed gas in any desired order. For example, the carbon dioxide absorption zone may be upstream or downstream from the sulphur dioxide and $NO_x$ absorption zones. However, since $SO_2$ tends to form heat stable salts in solvents for weaker acid gasses, it is preferable to capture $SO_2$ before other impurity gasses.

The captured pollutant is removed from rich amine solvent stream by heating the stream so as to liberate the captured pollutant. Preferably, a steam stripping column is utilized wherein steam provides at least some of the required heat to liberate the captured pollutant from the solvent. As shown in FIG. 1, rich amine solvent stream 40 and hot lean amine solvent stream 46 may be passed through an indirect heat exchanger 44 to produce hot rich amine solvent stream 48 that is introduced into steam-stripping column 50.

As with absorption column 32, steam stripping column 50 may be of any design known in the art and may be either a packed or tray design. The hot rich amine solvent stream 48 preferably flows downward through, e.g., packing 52, in the regeneration or steam stripping tower 50. Hot rich amine solvent stream 48 is introduced at an upper portion of column 50 to flow downwardly through column 50. If desired, pump 64 is used to circulate stream 66 from the bottom of the regeneration tower 50 to reboiler 54. It will be appreciated that reboiler 54 may be a forced circulation reboiler, a kettle reboiler or a thermosyphon reboiler. A hot lean amine pump is preferably provided to push the solvent through the lean-rich exchanger into a lean amine surge tank (not shown). The steam generated by the boiling of the amine solvent in reboiler 54 enters column 50 as stream 60 to provide the energy and mass transfer promotion for stripping the acid gas from the amine solvent.

The reboiler is heated by any means known in the art. Preferably, reboiler 54 is indirectly heated by stream 56 (which may be steam and may be obtained from any source) through e.g., a heat transfer tube bundle, producing a steam condensate stream 58 which may be recycled to produce additional steam or used elsewhere in a plant. The boiling of the solvent in re-boiler 54 produces a flow of steam and desorbed acid gas 60 into column 50. The steam and desorbed acid gas ascends upwardly through the desorption zone (packing 52) of column 50, heating the downward flow of hot rich amine solvent stream 48 and carrying upwards the gaseous pollutant that is evolved from the solvent. The steam and pollutant (in this case sulphur dioxide) exits column 50 as stream 62. Preferably, the steam and desorbed acid gas travel upward through a reflux rectification section 68 of the regeneration tower 50 prior to exiting tower 50 as stream 62.

Stream 62 is cooled in the overhead condenser 70, which condenses most of the steam, creating two-phase stream 72 which may be separated in reflux accumulator 74 into overhead liquid reflux stream 76 and an acid gas stream 78. The acid gas may flow to disposal or further processing. Overhead reflux stream 76 is split into stream 80, which is used in the ion exchange process, and stream 82, which is returned to regeneration tower 50 so as to return to the amine solvent.

Regenerated solvent collects in the bottom of column 50 and is removed from column 50 as stream 66, a portion of which is recycled as regenerated hot lean amine solvent stream 46. Lean amine from the bottom of the regeneration tower 50 flows as stream 46 through the heat exchanger 44 to form cool lean amine stream 84.

Heat stable salts tend to build up in the amine solvent. Accordingly, the amine solvent is subjected to an ion exchange process to remove the heat stable salts. For example, at least a portion of the amine solvent is subjected to ion exchange to remove heat stable salts therefrom and preferably only a portion thereof (e.g. a bleed stream). Preferably, the bleed stream is drawn from cool lean amine stream 84. According to such an embodiment, as is illustrated in FIG. 1, stream 86 sends amine solvent rich in heat stable salts to the ion exchange heat stable salt removal unit 90. Ion exchange unit 90 returns first heat stable salt lean amine solvent stream 88 having a lower heat stable salt content. Stream 38 completes the circuit, sending lean amine solvent for acid gas scrubbing to the absorber tower 32.

As is known to those familiar with the art, the details of the amine treater process may be changed or added to without changing the general principles or their relevance to the present invention. For example, different types of equipment for effecting gas-liquid contact in the absorber and regenerator may be used to accomplish the same effect of absorption and stripping. Other flow sheets, such as those having lean and semi-lean amine streams may also be used in the application of the present invention.

FIG. 2 shows one embodiment of an ion exchange unit 90 which may be used in accordance with the instant invention. As shown therein, ion exchange unit 90 includes optional surge tank 92 and a single ion exchange column 94. As the ion exchange resin in ion exchange column 94 must be occasionally regenerated, it will be appreciated that on a periodic basis (i.e. from time to time as may be required) the flow of heat stable salt rich lean amine solvent stream 96 through ion exchange column 94 will be terminated permitting the ion exchange resin to be regenerated. In an alternate embodiment, it will be appreciated that a plurality of ion exchange columns 94 may be provided. Accordingly, heat stable salt rich lean amine solvent stream 96 may be continuously fed through at least one ion exchange column 94 to remove heat stable salts therefrom while the ion exchange resin in one or more alternate columns 94 is being regenerated.

Any construction for an ion exchange reactor known in the art may be utilized. Typically, the ion exchange medium is a resin that is formed as beads. Accordingly, an ion exchange column typically has a support to receive the ion exchange resin beads. The ion exchange medium therefore may be beads of polymers that have functional groups on the polymer. An anion exchange resin generally has basic functions as the exchange sites. A variety of ion exchange resins may be used in the process of this invention. Strong base anion exchange resins are typically characterized as having fixed quaternary amine anion exchange sites, which are positively charged at any pH. Weak base anion exchange resins have fixed primary or secondary amine anion exchange sites. The sites are positively charged, depending upon the pH of the solution. At higher pH, the sites are neutral.

Type I strong base resins are those that contain tetramethylammonium functional groups. Type II strong base resins generally contain hydroxyethyltrimethylammonium functional groups. Examples of strong based Type I anion exchange resins are styrene-divinylbenzene resins with quaternary ammonium groups attached to the polymer framework, such as Resintech™ SBG-1 and Sybron™ ASB-1, sold by Resintech Company. Strong base Type II anion exchange resins include styrene-divinylbenzene resins with quaternary alkanolamine groups attached to the polymer framework, such as Resintech™ SBG-II and Sybron™ ASB-II, also available from Resintech Company. Other resins that may be used include such materials as Bayer AG's Mobay™ M500, a Type I strong base anion exchange resin, which is a polystyrene resin with quaternary ammonium groups attached to the polymer framework; Rohm and Haas Amberlyst™ A-26, Type I strong base anion exchange resin, which is a styrene-divinylbenzene copolymer with quaternary ammonium groups attached to the polymer framework; and, Rohm and Hass Amberlite™ IRA410, a Type II strong base amine type anion exchange resin. Also included are Dow styrene-divinylbenzene strong base anion exchange resins having quaternary amines as their functional groups. These materials are available under the DOWEX trademark. Weak base acrylic gel resins such as supplied by Purolite™ may also be used. Either gel or macroporous resins may be used.

The preceding resins are merely illustrative of useful ion exchange resins and are not intended to limit the resins that may be used in carrying out the process of the invention. For the purpose of the present invention, it is intended that any ion exchange resin used for the reclamation of spent amine solvents can be regenerated using the process disclosed herein. These resins are readily identifiable by those skilled in the art.

Heat stable salt rich lean amine solvent stream 96 (which may be obtained from surge tank 92) or may merely be an extension of bleed stream 86 if surge tank 92 is not provided, is permitted to flow through ion exchange column 94 to produce first heat stable salt lean amine solvent stream 88. This is the resin loading step or the exhaustion of the resin step. During this step, the resin in column 94 interacts with the amine solvent to remove heat stable salts from the amine solvent. When the ability of the ion exchange resin to remove heat stable salts from the amine solvent reaches a desired level, or after a pre-determined time, the flow of amine solvent through column 94 is terminated.

It is preferred to remove heat stable anions from the amine solvent which is lean in respect to amine absorbable gases, rather than the amine solvent which is rich with respect to amine absorbable gases, since the ion exchange resin will also tend to react with the anions of the amine absorbable gas that are present in the amine solvent. Accordingly, by providing lean amine solvent to column 94, a greater proportion of the ion exchange resin will interact with the heat stable salts present in the lean amine solvent as opposed to anions from the amine absorbable gas, such as sulphite. Therefore, per unit volume of amine solvent that passes through the ion exchange column, a greater proportion of heat stable salts will be removed from the amine solution.

The interaction of the amine solvent with the ion exchange resin results in the amine solvent being converted to its free base form. The amine solvent having a reduced concentration of heat stable salt (i.e. the first heat stable salt lean amine solvent stream 88) is then returned to amine treater unit 10. The first heat stable salt lean amine solvent stream 88 may be returned to any desired location in amine treater process and, preferably, is introduced downstream from heat exchanger 44 and upstream from column 32 as shown in FIG. 1.

Some amine treater processes may operate with a significant level of heat stable salts present (see for example U.S. patent application Ser. No. 10/639,678). In such a case, it is desired to reduce the heat stable salt only partially, but still passing enough heat stable salt containing amine solvent through column 94 to fully saturate the ion exchange resin with heat stable anions prior to the regeneration of the ion exchange resin. This maximizes the efficiency of the ion exchange process with respect to amine loss and regenerant and rinse liquid requirements per amount of anions removed.

Subsequent to the exhaustion step, the ion exchange resin is preferably treated to remove the amine solvent therefrom prior to commencing the regeneration step. Therefore, in accordance with this invention, the ion exchange resin is preferably contacted with a wash stream, which may be acidic, to remove amine solvent from column 94.

The reflux, after passing through column 94, produces second heat stable salt lean amine solvent stream 98 due to the addition of the water in the portion of reflux stream 80 provided to column 94. The concentration of the amine in stream 98 is dilute compared to the amine circulating in amine treater unit 10. However, by recycling stream 98 to amine treater unit 10, essentially all of the water and amine diverted to ion exchange unit 90 is returned to amine treater unit 10 thereby essentially maintaining the mass balance of amine treater unit 10 and, accordingly, preventing dilution of the amine in amine treater unit 10, which would occur if fresh water were used for the washing step as opposed to reflux 80.

It will be appreciated that in an alternate embodiment, some make up water may be added to reflux stream 80 if required. The need for additional wash water might arise in cases where the amount of reflux produced is low, due to a low steam requirement for regeneration, but where the rate of heat stable accumulation is high, requiring a high operating rate for the IX unit. Up to 3 parts of water could be added to one part reflux, but it is preferred to add as little as possible.

Stream 98 may be returned to the continuous amine loop in amine treater unit 10 downstream from heat exchanger 44 and upstream from column 32 (similar to stream 88). Alternately, stream 98 may be returned to the steam-stripping portion of the amine treater process (it may be added to one or both of stream 82 and stream 48). Such an alternate routing may be utilized if the amine absorbable gas is $SO_2$.

An added advantage to utilizing reflux to flush amine from column 94 is that metal cations, which are precipitated from the amine (e.g. $Fe^{3+}$) or are deposited in the ion exchange column from solids suspended in the amine (e.g. calcium carbonate), will tend to be resolubilized. If these metal cations are not resolubilized, then they will tend to impede liquid flow through the ion exchange column or possibly interfere with anion transport into or out of the resin.

Preferably, at the end of the wash step, and prior to the regeneration step, the ion exchange resin is washed with deionized water or steam condensate, which may be supplied by stream 100. This wash water is provided to remove the reflux from column 94. The passage of wash water 100 through column 94 results in a wash water effluent stream 102 which may be fed to storage tank 104 for reuse.

Subsequently, the ion exchange resin is regenerated using a regeneration agent. For example, the regeneration agent may be a caustic solution (e.g. 4% sodium hydroxide solution), which is supplied via stream 106. The regeneration agent converts the ion exchange resin back to its starting form. Accordingly, if the ion exchange resin is an anion exchange resin, and the regeneration agent is a caustic, then the caustic converts the ion exchange resin back to its base form (for example a free amine in the case of a weak base resin and a hydroxide form in the case of a strong base resin). The regeneration step results in the production of a spent regeneration agent solution 108. Stream 108 may be fed to prescrubber 14 (it may form part or all of stream 28). Accordingly, the water in stream 108 may be utilized to quench the feed gas. In addition, any unreacted caustic will be available to neutralize strong acids, such as sulphuric acid, which is present in the prescrubber water stream 20.

Subsequent to the regeneration step, the ion exchange resin is again washed to remove caustic therefrom. Accordingly, fresh water and/or water from tank 104 may be fed to ion exchange, column 94 via stream 110. Displacing the caustic regeneration agent from the ion exchange bed avoids contamination of the amine solvent with caustic or sodium salts during the next loading step. The spent wash water, which will contain some caustic, may also be directed to prescrubber via stream 28.

Preferably, the final ion exchange resin wash is performed with deionized water or steam condensate, supplied via stream 100 to remove additional amounts of caustic and salts from the ion exchange resin. This wash water may be directed to tank 104 via stream 102 for re-use as the spent wash water is relatively low in dissolved caustic solvents. After the final wash step, a further resin-loading step may be commenced.

It has been found that the removal of heat stable salts from both strong and weak amine solvents can be performed by essentially the same process, with only optional adjustment for the type of resin and type and quantity of regeneration agent and rinse volumes being necessary to optimize for each particular amine solvent and type of heat stable salts.

It will be appreciated that various modifications and variations may be made and all of those modifications and variations are within the scope of the following claims. For example, any $SO_2$, $CO_2$ and $H_2S$ solvent known in the art may be used. The solvents may be regenerated and recycled and, if so, they and may be regenerated and recycled by any means known in the art. The ion exchange unit may use surge tanks and storage tanks to accumulate the various streams which are used in the ion exchange unit or which are produced by the ion exchange unit. Any ion exchange resin or series of resins known in the art may be used. It will also be appreciated that the steps may be combined in various combinations and sub-combinations.

EXAMPLES

The operation of the invention is illustrated by the following representative examples. As is apparent to those skilled in the art of ion exchange, many of the details of the examples may be changed while still practicing the invention described herein.

Example

Operation of the invention was tested in a pilot plant. The experiments were performed for the removal of heat stable salts from a diamine $SO_2$ absorbent (Cansolv™ Absorbent DM), having a concentration of 26.9% amine, 12.5% sulfate and 1.8% sulfite. The concentration of heat stable salt (sulfate) in this amine solvent was 1.36 moles/mole of amine. An ion exchange column with a diameter of 6 inches was filled to a height of 21.3 inches with Purolite™ A-830 weak base resin, corresponding to a resin bed volume (BV) of 10 liters. The ion exchange column was fed liquids from heated tanks by centrifugal pumps. Appropriate valves, pressure gauges, thermometers and rotameters were installed for safe and convenient operation of the unit. All the fluids were heated to 50° C. Synthetic reflux was prepared by bubbling $SO_2$ gas into water until a nominal concentration of 1.5% was reached (pH=1.5).

Analysis for amine and anions were performed with ion chromatography while low sodium ion concentrations were quantified by a conductivity measurement using a calibration curve. Low concentrations of amine in aqueous matrices were quantified by gas chromatography. The operating cycle of the process consisted of the following sequence:

1. Loading of resin with heat stable anions by passing 4 BV of amine solvent through the column.
2. Displacing the amine solvent and washing the amine from the resin with 2.25 BV of reflux.
3. Displacing the reflux with 0.5 BV of deionized water.
4. Regenerating the resin back to the base form by passing 4 BV of 4% sodium hydroxide through the column.
5. Final wash with 1.5 BV of water saved from the end of the previous final wash and then with 4.5 BV of deionized water.
6. The next loading step was conducted.

This experimental sequence gave the following results, averaged over a large number of cycles:

1. A loading of 100 grams of $SO_4^=$ per liter of resin was obtained.
2. The amine loss was 21 grams per kilogram of $SO_4^=$ removed from the amine solution, mainly due to incomplete removal of amine from the column by the reflux washing.
3. During one cycle, the amine, which is returned to the treater process, was diluted by about 0.4% (e.g. from 26.9% to 26.8% amine), due to water mixing into the amine at the interface between the final wash of the previous cycle and the amine of the next cycle. If the amine wash water were from an external source, the dilution would be 34%, (from 26.9 to 17.8%). The final concentration of the amine here is calculated as the sum of dilution of the 4 BV of amine solvent by interface mixing (0.2 BV of water) and the 2.25 BV of wash water.

The invention claimed is:

1. A process for regenerating an ion exchange resin comprising:
    (a) obtaining a solvent solution containing heat stable salts from an amine treater process;
    (b) contacting the solvent solution with an anion exchange resin to obtain a heat stable salt lean solvent solution;
    (c) periodically regenerating the anion exchange resin, wherein prior to the regeneration of the anion exchange resin, the anion exchange resin is washed with at least a portion of a reflux stream from the amine treater process to produce a heat stable salt lean amine stream; and, (d) recycling the heat stable salt lean amine to the amine treater process.

2. The method of claim 1 wherein the amine treater process treats a feed gas to remove one or more of $SO_2$, $H_2S$ and $CO_2$.

3. The method of claim 1 wherein during step (c):

the anion exchange resin is contacted with the at least a portion of the reflux stream to wash amine solvent from the anion exchange resin;

the anion exchange resin is subsequently contacted with a regeneration agent to obtain regenerated anion exchange resin and spent regeneration agent solution; and, the anion exchange resin is washed with water to remove the regeneration agent therefrom and to obtain a regeneration agent wash effluent.

4. The method of claim 3 further comprising washing the regenerated anion exchange resin with water to remove the regeneration agent therefrom prior to using the regenerated anion exchange resin in step (b) of claim 1 wherein at least a portion of the water is obtained from the reflux stream.

5. The method of claim 3 further comprising:

subjecting a feed gas stream provided to the amine treater process to a pre-scrubbing operation;

using all or a portion of one or both of the spent regeneration agent solution and the regeneration agent wash effluent in the pre-scrubbing operation.

6. The method of claim 3 further comprising draining amine solvent from the anion exchange resin prior to contacting the anion exchange resin with water to wash amine solvent from the anion exchange resin.

7. The method of claim 1 wherein the heat stable salt lean amine is recycled to the amine treater process.

8. The method of claim 1 wherein the reflux is utilized without dilution to wash the amine solvent from the anion exchange resin.

9. The method of claim 1 wherein the amine treater process comprises:

contacting a feed gas stream comprising an amine capturable gas with a lean amine solvent to form a rich amine solvent, wherein heat stable salts are present in the rich amine solvent;

stripping amine capturable gas from the rich amine solvent to form the lean amine solvent and an overhead reflux stream; and, periodically using at least a portion of one or both of the lean amine solvent and the rich amine solvent as the solvent solution;

and the method further comprises selecting the lean amine solvent as the solvent solution that is contacted with the anion exchange resin.

10. The method of claim 1 further comprising selecting the solvent solution to comprise an amine solvent, which has an amine with a pKa in the range 2.5-6.

11. The method of claim 10 further comprising selecting $SO_2$ as an amine capturable gas to be captured by the amine treater process.

12. The process of claim 1 further comprising selecting the solvent solution to comprise an amine solvent, which has an amine with a pKa in the range 7.5-10.

13. The method of claim 12 further comprising selecting one or more of $H_2S$ and $CO_2$ as an amine capturable gas to be captured by the amine treater process.

14. The method of claim 1 wherein the amine treater process comprises:

(a) contacting a feed gas stream comprising an amine capturable gas with a lean amine solvent to form a rich amine solvent, wherein heat stable salts are present in the rich amine solvent;

(b) stripping amine capturable gas from the rich amine solvent to form the lean amine solvent and an overhead reflux stream; and, (c) periodically using at least a portion of one or both of the lean amine solvent and the rich amine solvent as the solvent solution;

and the method further comprises recycling the heat stable salt lean amine to step 31(a).

15. The method of claim 1 wherein the amine treater process comprises:

(a) contacting a feed gas stream comprising an amine capturable gas with a lean amine solvent to form a rich amine solvent, wherein heat stable salts are present in the rich amine solvent;

(b) stripping amine capturable gas from the rich amine solvent to form the lean amine solvent and an overhead reflux stream; and, (c) periodically using at least a portion of one or both of the lean amine solvent and the rich amine solvent as the solvent solution;

and the method further comprises recycling the heat stable salt lean amine to step 32(b).

16. The method of claim 15 further comprising selecting $SO_2$ as the amine capturable gas.

* * * * *